Nov. 2, 1926.  1,604,974
J. COLOMBO ET AL
ELECTRIC SIGNAL SYSTEM FOR VEHICLES
Filed Jan. 26, 1925
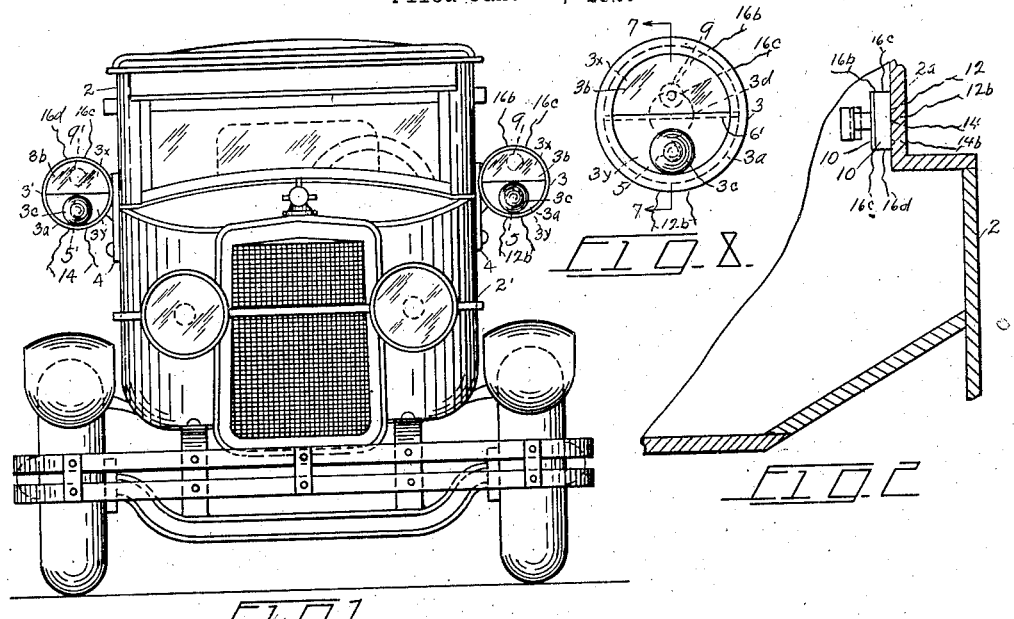
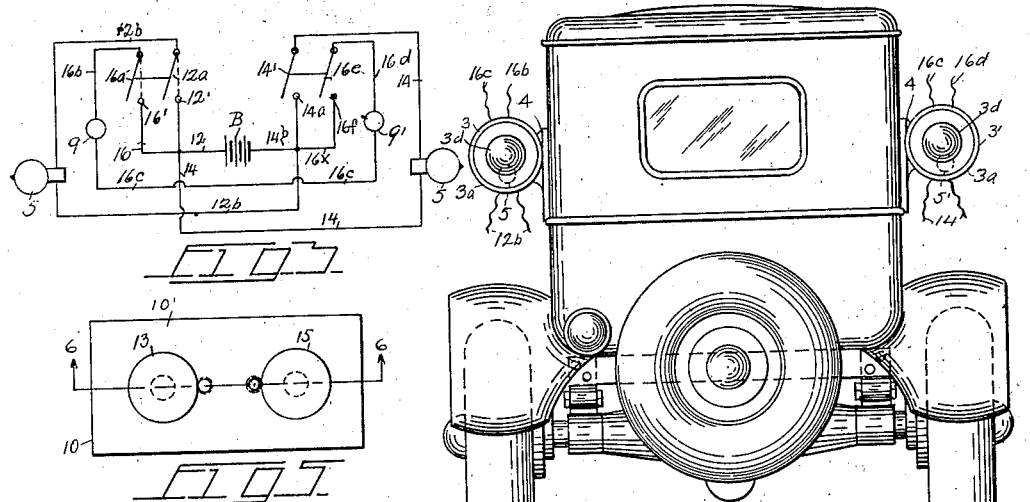
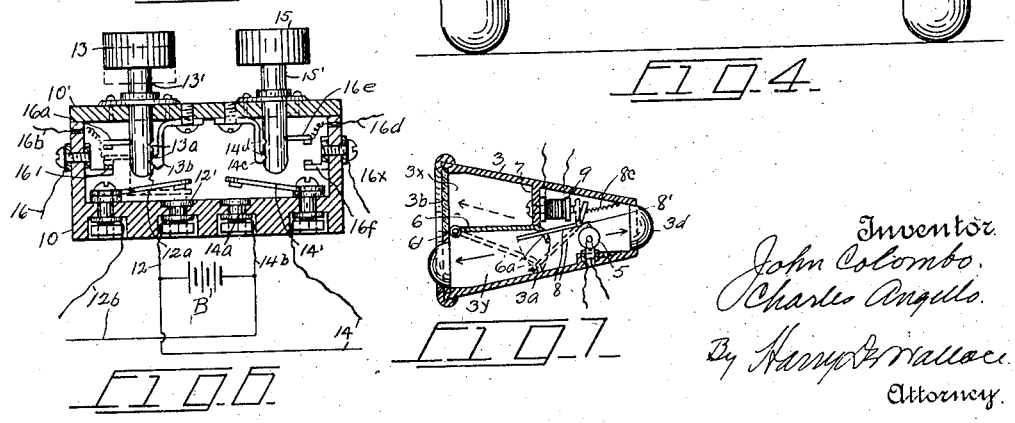
Inventor
John Colombo
Charles Angullo
By Harry R Wallace
Attorney Patented Nov. 2, 1926.

1,604,974

UNITED STATES PATENT OFFICE.

JOHN COLOMBO AND CHARLES ANGELLO, OF AUBURN, NEW YORK.

ELECTRIC SIGNAL SYSTEM FOR VEHICLES.

Application filed January 26, 1925. Serial No. 4,811.

This invention relates to improvements in combined direction and pilot signals, designed particularly for use in connection with automobiles, and other vehicles, and has for its object to provide novel and simple means for indicating to drivers of approaching and following vehicles as well as to pedestrians, the right and left turning and also the position of the vehicle when parked. A further object is to provide a signal system of the class consisting of similar electric lamps, which are disposed at the opposite side of the body of the vehicle, and are arranged to be controlled by the driver, by means of a simple switch mechanism, which may be mounted on the dash, within easy reach of the driver. A further object is to provide a signal lamp for each side of an automobile or vehicle, which is arranged to flash red or other color lights towards the front and rear simultaneously, for indicating turning movements of the vehicle, the said lamps also being arranged to show white lights to vehicles approaching head-on, and at the same time to show red or danger lights rearwardly when the automobile is parked at the curb or elsewhere. And a further object is to provide novel switch mechanism, comprising separate units which cooperate with independent circuits, by means of which the direction indicating lights, as well as the parking lights, may be operated by the same controlling parts.

We attain these objects by the means set forth in the detailed description which follows, and as illustrated by the accompanying drawing, in which, Figure 1 is a front end elevation of a closed automobile to which our improvement is applied. Fig. 2 is a broken sectional view of the dash of the vehicle showing the switch for controlling the lamps. Fig. 3 is a diagrammatic view of the electric circuits. Fig. 4 is a rear end elevation of the automobile. Fig. 5 is an enlarged front face view of the switch box. Fig. 6 is a horizontal section taken on line 6—6 of Fig. 5. Fig. 7 is a central vertical longitudinal section, taken on line 7—7 of Fig. 8, showing the construction and arrangement of the combined pilot and signal lamp. And Fig. 8 is a front end view of the same.

In the drawing, 2 represents generally an automobile, 2' the body, and 2ª the dash of the car, which for the purpose of illustrating and describing the application of our invention, represents a familiar type of closed vehicle. Our invention consists chiefly of similar electric headlights or lamps 3—3', which are preferably disposed at the opposite front-side portions of the body 2', to which they may be suitably secured, by means of brackets 4, the said lamps being mounted in extended relation to the opposite sides of the body, so that the illumination from said lamps may be clearly observed, by drivers of vehicles, which approach or follow the car 2. The lamps 3—3' comprise similar conical or tapering casings 3ª, whose expanded ends preferably face forwardly, the said ends being provided with relatively large clear semi-circular lenses 3ᵇ, which normally close the upper portions of said ends, and also with relatively small red or other color glass bull's-eyes 3ᶜ, which are disposed near the bottom margins of said ends. The reduced rear ends of said casings are fitted with similar red or other color bull's-eyes 3ᵈ. Within the casings 3ª are disposed small low-voltage electric bulbs 5—5', such as are usually employed for tail and similar low-power lights. These bulbs may be secured to the bottoms of the casings, in the usual manner. The bulbs 5—5' are preferably arranged to illuminate the bull's-eyes 3ᶜ—3ᵈ, which according to our invention are employed for flashing signals for indicating either right or left hand turns of the vehicle. These color signal lights are not intended to be lighted continuously, while the vehicle is being driven straight-away. The casings 3—3' are also divided horizontally, into upper and lower compartments, as 3ˣ—3ʸ, by means of similar movable partitions or gates 6, the said gates preferably being made of polished metal, and adapted to serve as reflectors, and being pivoted for vertical movements, by means of transversely disposed rods 6'. The casings 3—3' are also provided with vertical walls 7, which depend from the top walls of the casings, and whose free lower edges terminate substantially at the line of the horizontal axis of the casings, and serve as abutments for stopping the upward movements of the gates 6. The gates, when in the elevated position shown in Fig. 7, separate the compartments 3ˣ—3ʸ, and at such times the bulbs 5—5' only illuminate the colored bull's-eyes 3ᶜ—3ᵈ. The partitions 6 are directly held in the elevated position, by means of bell-cranks 8, which are pivoted on rods 8', the latter extending transversely through the casing 3. The long arms of the bell-cranks extend forwardly and pass loosely through slots $6^a$ formed in the free ends of the partitions 6, as shown in Fig. 7. The short arms $8^b$ of the bell-cranks preferably comprise armatures, which are positioned within attractive distance of electro-magnets 9—9', the latter being supported by the depending walls 7. The gates 6 and the bell-cranks 8, are held in the idle position, shown by full lines in Fig. 7, by means of springs $8^c$, which extend between the armatures $8^b$ and the top walls of the casings. The gates 6 are lowered, as shown by dotted lines in Fig. 7, for shutting off the rays of the bulbs 5—5' from the forward bull's-eyes $3^c$, and for illuminating the clear lens $3^b$, by the energizing of the magnets 9—9'. By this construction and arrangement of the signal lamps, colored lights may be constantly maintained at the rear bull's-eyes $3^d$, while the bull's-eyes $3^c$, and the clear lenses $3^b$, may be alternately illuminated, at will.

The lamps 5—5', and the electro-magnets 9—9', are independently controlled by a group of novel switch units, the latter being enclosed in a hollow body or casing 10, having a normally open top, which is closed by a perforated lid 10'. The switch units are arranged to be operated separately, by independent circuits, that derive the electric current from a common battery as B. The circuit for the bulb 5 comprises the battery, a wire 12 leading from the positive pole of the battery, to a stationary switch terminal 12', which is adapted to be engaged by a flexible terminal $12^a$, from which a wire $12^b$ leads to the bulb 5, and thence back to the negative pole of the battery. The switch 12'—$12^a$ may be closed by a key 13, whose stem 13' is reciprocably supported by the lid 10'. The stem 13' is formed with similar spaced notches or teeth $13^a$, which are adapted to be engaged by a spring detent $13^b$, the latter being supported by the cover 10'. By this construction and arrangement, the key 13 may be held positively in either the operated or released position, as shown respectively, by the dotted and full lines in Fig. 6. The circuit for the bulb 5' comprises the battery B, a wire 14 that leads from the positive pole of the battery to the bulb 5', thence back to a flexible terminal 14', thence to a stationary terminal $14^a$, and thence via a wire $14^b$, to the negative pole of the battery. The switch 14'—$14^a$ is controlled by a similar key 15 which is also supported by the lid 10'; the idle and operated positions of said key being controlled by a similar detent $14^c$, which engages notches $14^d$ of the key stem. By this arrangement, of the lighting circuits, each bulb may be lighted or extinguished independently of the other, and both bulbs may be lighted by the simultaneous depressing of the keys 13—15.

The electro-magnets 9—9' are preferably connected in series, by means of a single circuit, as follows: from the positive pole of the battery B a wire 16 leads to a stationary switch terminal 16', which is preferably mounted on one inner wall of the box 10. The terminal 16' is arranged (when the key 13' is depressed) to be engaged by a movable terminal $16^a$, which is preferably mounted on the stem of the key 13, and from which a wire $16^b$ extends to the magnet 9, in the lamp 3, thence by a wire $16^c$ to the magnet 9', in the lamp 3'. From the magnet 9' a wire $16^d$ leads to a movable terminal $16^e$ mounted on the stem of the key 15, which is adapted to engage a stationary terminal $16^f$ mounted on the opposite inner wall of the box 10. The terminal $16^f$ is then connected to the negative pole of the battery B, by a wire $16^x$. The construction and arrangement of the electro-magnet circuit is such that, either of the keys 13—15 may be operated singly, without energizing the magnets 9 or 9'. But when the keys 13—15 are depressed at the same time, the two switches 16'—$16^a$ and $16^e$—$16^f$ become closed, and the magnets 9—9' will simultaneously attract the armatures $8^b$, for effecting the lowering of the gates 6, for projecting clear white lights forwardly, and red lights rearwardly, at the opposite side of the car, when the vehicle is parked at the curb, or at other public places.

Having thus described our invention, what we claim, is—

1. An electric signal for automobiles and the like comprising a lamp casing, a pair of lenses at the front end of said casing, a lens at the rear end of the casing, a source of light intermediate the ends of the casing, a depending partition arranged intermediate the ends of the casing, a shutter pivoted to the casing at a point between the pair of lenses whereby to selectively illuminate the front lenses in conjunction with the rear lens, said shutter being engageable with a side of the casing and with the lower edge of the partition whereby to limit the pivotal movements of the shutter, and means to actuate the shutter.

2. An electric signal system for automobiles and the like, comprising similar lamps adapted to be mounted on the right and left sides of the vehicle, a clear lens and a colored lens in the forward end of each lamp, a colored lens in the rear end of each lamp, an electric bulb disposed in each lamp between the front and rear lenses, an independent electric circuit for controlling each of the said bulbs and for illuminating the forward and rear colored lenses of each lamp, a third electric circuit, means operated by said third circuit for effecting the darkening of the forward colored lenses and for illuminating the clear lenses and the rear colored lenses in both of said lamps simultaneously.

3. An electric signal system for vehicles, comprising signal lamps adapted to be mounted on the right and left sides of the vehicle, each of said lamps having forwardly and backwardly facing colored lenses and each lamp having a forwardly facing clear lens, an electric bulb disposed in each lamp for illuminating the said lenses, independent electric circuits for controlling the illumination of the colored lenses of said lamps, an electric circuit for controlling the darkening of the forward colored lenses and for effecting the illumination of the clear lenses without disturbing the rear colored lights, and a switch mechanism comprising keys separably operable, and means to effect the illumination of the corresponding colored lenses upon separate operation of the keys, and when operated simultaneously to effect the illumination of the clear lenses and the rear colored lenses of the two lamps.

4. An electric signal for automobiles and the like comprising a lamp casing, a pair of lenses at the front end of said casing, a single lens at the rear end thereof, a single source of light intermediate the ends of the casing, a depending partition arranged intermediate the ends of the casing, a solenoid supported by said partition and a shutter actuated by said solenoid whereby to selectively illuminate the front lenses in conjunction with the rear lens, said shutter being engageable with the lower edge of the partition whereby the latter acts to limit the upward movement of the shutter.

5. An electric signal for automobiles and the like comprising a lamp casing, a pair of lenses at the front end of said casing, a single lens at the rear end thereof, a depending partition arranged intermediate the ends of the casing, a light bulb mounted within said casing, a movable shutter within said casing adapted to selectively shield the front lenses and having its movement limited by the lower end of said partition and means supported by said partition for actuating the shutter.

In testimony whereof we affix our signatures.

JOHN COLOMBO.
CHARLES ANGELLO.